US012572787B2

(12) United States Patent
Kornijcuk et al.

(10) Patent No.: US 12,572,787 B2
(45) Date of Patent: Mar. 10, 2026

(54) NEUROMORPHIC DEVICE THAT PROVIDES A LOOKUP TABLE BASED RECONFIGURABLE NEURAL NETWORK ARCHITECTURE

(71) Applicant: KOREA INSTITUTE OF SCIENCE AND TECHNOLOGY, Seoul (KR)

(72) Inventors: Vladimir Kornijcuk, Seoul (KR); Doo Seok Jeong, Seoul (KR); Joon Young Kwak, Seoul (KR); Jae Wook Kim, Seoul (KR); Jong Kil Park, Seoul (KR); In Ho Kim, Seoul (KR); Jong Keuk Park, Seoul (KR); Su Youn Lee, Seoul (KR); Yeon Joo Jeong, Seoul (KR); Joon Yeon Chang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 1092 days.

(21) Appl. No.: 17/615,394

(22) PCT Filed: Jul. 5, 2019

(86) PCT No.: PCT/KR2019/008303
§ 371 (c)(1),
(2) Date: Nov. 30, 2021

(87) PCT Pub. No.: WO2021/002523
PCT Pub. Date: Jan. 7, 2021

(65) Prior Publication Data
US 2022/0230060 A1 Jul. 21, 2022

(30) Foreign Application Priority Data

Jul. 4, 2019 (KR) ........................ 10-2019-0080624

(51) Int. Cl.
*G06N 3/065* (2023.01)
*G06N 3/049* (2023.01)
(52) U.S. Cl.
CPC ............. *G06N 3/065* (2023.01); *G06N 3/049* (2013.01)
(58) Field of Classification Search
CPC ......... G06N 3/065; G06N 3/049; G06N 3/063
See application file for complete search history.

(56) References Cited

U.S. PATENT DOCUMENTS 11,423,287 B2 * 8/2022 Lorrain ................. G06N 3/063
2008/0183982 A1 * 7/2008 Sugahara ............ G06F 12/0246
711/E12.001

(Continued)

FOREIGN PATENT DOCUMENTS

EP 3343457 A1 * 7/2018 ............. G06N 3/082
JP 2016-522495 A 7/2016

(Continued)

OTHER PUBLICATIONS

M. J. Akhbarizadeh and M. Nourani, "An IP packet forwarding technique based on partitioned lookup table," 2002 IEEE International Conference on Communications. Conference Proceedings. ICC 2002 (Cat. No.02CH37333), New York, NY, USA, 2002, pp. 2263-2267 vol. 4 (Year: 2002).*

(Continued)

*Primary Examiner* — Andrew J Jung
(74) *Attorney, Agent, or Firm* — Paratus Law Group, PLLC

(57) ABSTRACT

A neuromorphic device includes: a neuron block unit including a plurality of neurons; a synapse block unit including a plurality of synapses; and a topology block unit including a plurality of parallel Look-Up Table (LUT) modules including pre and post neuron elements configured with addresses (Continued)

100 of a presynaptic neuron and a postsynaptic neuron. Each of the plurality of neurons has an intrinsic address, each of the plurality of synapses has an intrinsic address. The parallel LUT module is partitioned based on a first synapse address among synapse addresses, and each of the partitions is indexed based on a second synapse address among the synapse addresses.

8 Claims, 11 Drawing Sheets

(56) References Cited

U.S. PATENT DOCUMENTS

| | | | | |
|---|---|---|---|---|
| 2013/0144821 A1* | 6/2013 | Heliot | | H03M 1/1042 |
| | | | | 706/15 |
| 2016/0196488 A1 | 7/2016 | Ahn | | |
| 2018/0181861 A1* | 6/2018 | Sumbul | | G06N 3/049 |
| 2018/0189645 A1* | 7/2018 | Chen | | G06N 3/049 |

| | | | | |
|---|---|---|---|---|
| 2019/0095776 A1* | 3/2019 | Kfir | | G06F 12/0207 |
| 2020/0234125 A1* | 7/2020 | Malach | | G06N 3/08 |
| 2020/0287831 A1* | 9/2020 | Lam | | H04L 47/125 |

FOREIGN PATENT DOCUMENTS

| | | |
|---|---|---|
| JP | 2017-538994 A | 12/2017 |
| KR | 10-2014-0132787 A | 11/2014 |
| KR | 10-2018-0093245 A | 8/2018 |
| KR | 10-2018-0102369 A | 9/2018 |
| KR | 10-2019-0008670 A | 1/2019 |

OTHER PUBLICATIONS

Wang R, Cohen G, Stiefel KM, Hamilton TJ, Tapson J, van Schaik A. An FPGA Implementation of a Polychronous Spiking Neural Network with Delay Adaptation. Front Neurosci. Feb. 13, 2013 (Year: 2013).*

International Search Report for PCT/KR2019/008303 mailed Apr. 2, 2020 from Korean Intellectual Property Office.

* cited by examiner

100

- - · - • Fan-out synapse for Neuron 2

- - - -• Fan-in synapse for Neuron 2

FIG. 4

| Signal name | Description |
| --- | --- |
| (G_)REQ | (Global) request for spike routing |
| (G_)ACK | (Global) routing acknowledgement |
| N_ADR | Event address |
| POST_ADR | Postsynaptic neuron address |
| SPIKE | Postsynaptic neuron excitation signal |
| S_ADR | Synapse address |
| S_UPD | Synapse update signal |
| UPD_SEL | Signal indicating if S_ADR is a fan-in or fan-out synapse |
| S_W | Synaptic weight |
| CORE | Index of the global event's origin core |
| DEST_CORE | Index of the global event's destination core |
| WRITE | Signal for writing a global event into its destination core's input FIFO |

(a)                                    (b)

NEUROMORPHIC DEVICE THAT PROVIDES A LOOKUP TABLE BASED RECONFIGURABLE NEURAL NETWORK ARCHITECTURE

CROSS-REFERENCE TO PRIOR APPLICATIONS

This application is a National Stage patent Application of PCT International Patent Application No. PCT/KR2019/008303 (filed on Jul. 5, 2019) under 35 U.S.C. § 371, which claims priority to Korean Patent Application No. 10-2019-0080624 (filed on Jul. 4, 2019), which are all hereby incorporated by reference in their entirety.

BACKGROUND

The present disclosure relates to a neuromorphic core technique and, more particularly, to a neuromorphic device that provides a lookup table based reconfigurable neural network architecture based on an Address Event Representation (AER) method.

Deep learning has drawn tremendous attention to the remarkable success in diverse tasks, such as high-precision facial recognition, automatic image colorization, and game mastering. The success is largely owed to the deep neural network. Generally, such networks are virtually built on general-purpose hardware albeit frequently powered by application-specific integrated circuits such as a tensor processing unit. Despite such ongoing success, skeptical views are emerging regarding the expectable astronomical growth of the required machine performance with respect to task complexity. In contrast, the human brain can perform tasks of high complexity by limited synaptic operations (about $10^{15}$ SynOP/s) by merely consuming about 15 W.

Neuromorphic engineering aims at the synthesis of a biologically plausible spiking neural network (SNN) on a silicon wafer to realize the capability to perform tasks in an energy-efficient manner in line with the human brain. A neuromorphic system can be built using neurons that are interconnected through synapses. The implementation of neurons and synapses is diverse. Analog and/or digital integrated circuits (IC) based on standard complementary metal oxide semiconductor (CMOS) technologies are common.

Korean patent publication number 10-2018-0093245 (Aug. 21, 2018) relates to a neuromorphic computation device and discloses a technique of providing a neuromorphic calculation device that transforms and outputs a result of an operation processed in an analog scheme to a digital value.

Korean patent publication number 10-2019-0008670 (Jan. 5, 2019) relates to a neuron circuit and a neuromorphic system including the same and discloses a technique of providing a neuron circuit for recognition rate increase of a synapse device having a non-linear resistance property and providing a neuromorphic system including the neuron circuit.

PRIOR ART

Patent Literature

Korean Patent Application Publication No. 10-2018-0093245 (Aug. 21, 2018)

Korean Patent Application Publication No. 10-2019-0008670 (Jan. 25, 2019)

SUMMARY

An embodiment of the present disclosure provides a neuromorphic device that provides a lookup table based reconfigurable neural network architecture based on an Address Event Representation (AER) method.

An embodiment of the present disclosure also provides a neuromorphic device which can process a spike routing by using a lookup table readout technique for on-chip learning.

An embodiment of the present disclosure also provides a neuromorphic device which can provide an arbitrary update for a synapse weight by processing a spike routing at a high speed by performing a parallel search for a plurality of divided partitions.

In an aspect, a neuromorphic device includes a neuron block unit including a plurality of neurons, wherein each of the plurality of neurons has an intrinsic address, a synapse block unit including a plurality of synapses, wherein each of the plurality of synapses has an intrinsic address, and a topology block unit including a plurality of parallel Look-Up Table (LUT) modules including pre and post neuron elements configured with addresses of a presynaptic neuron and a postsynaptic neuron, wherein the parallel LUT module is partitioned based on a first synapse address among synapse addresses, and each of the partitions is indexed based on a second synapse address among the synapse addresses.

The topology block unit may determine a higher bit string capable of expressing the plurality of parallel LUT modules to the first synapse address in the synapse address.

The topology block unit may determine a lower bit string capable of indexing the plurality of the synapses by each of the plurality of parallel LUT modules to the second address.

The topology block unit may further include an index address generator for generating index addresses to be provided to each of the parallel LUT modules sequentially up to the second synapse address.

The topology block unit may further include a comparator for comparing one of the addresses of a presynaptic neuron and a postsynaptic neuron in the pre and post neuron elements respectively output from each of the parallel LUT modules with an address of a spiking neuron.

When the address of a spiking neuron coincides with the addresses of a presynaptic neuron and a postsynaptic neuron, the comparator may output the corresponding index address.

The topology block unit may further include a buffer that includes a plurality of index storage spaces partitioned based on the first synapse address.

The buffer may provide a synapse update signal through spiking whether the address coincides with one of the addresses of a presynaptic neuron and a postsynaptic neuron.

When a specific index address is output from the comparator, the topology block unit may store the specific index address in a corresponding index address storage space.

When a coincidence occurs through the comparison, the topology block unit may merge the index address provided by the corresponding parallel LUT module to output as an address of the synapse connected to the spiking neuron.

The present disclosure may have the following technical effects. However, this does not mean that a specific embodiment includes the entire effects or only the following effects, and accordingly, it is understood that the scope of the present disclosure is not limited thereto.

A neuromorphic device according to an embodiment of the present disclosure can process a spike routing by using a lookup table readout technique for on-chip learning.

A neuromorphic device according to an embodiment of the present disclosure can provide an arbitrary update for a synapse weight by processing a spike routing at a high speed by performing a parallel search for a plurality of divided partitions.

BRIEF DESCRIPTION OF THE DRAWINGS

FIG. 4 is a diagram illustrating signals used in a neuromorphic device according to an embodiment of the present disclosure.

DETAILED DESCRIPTION

Figure 1:
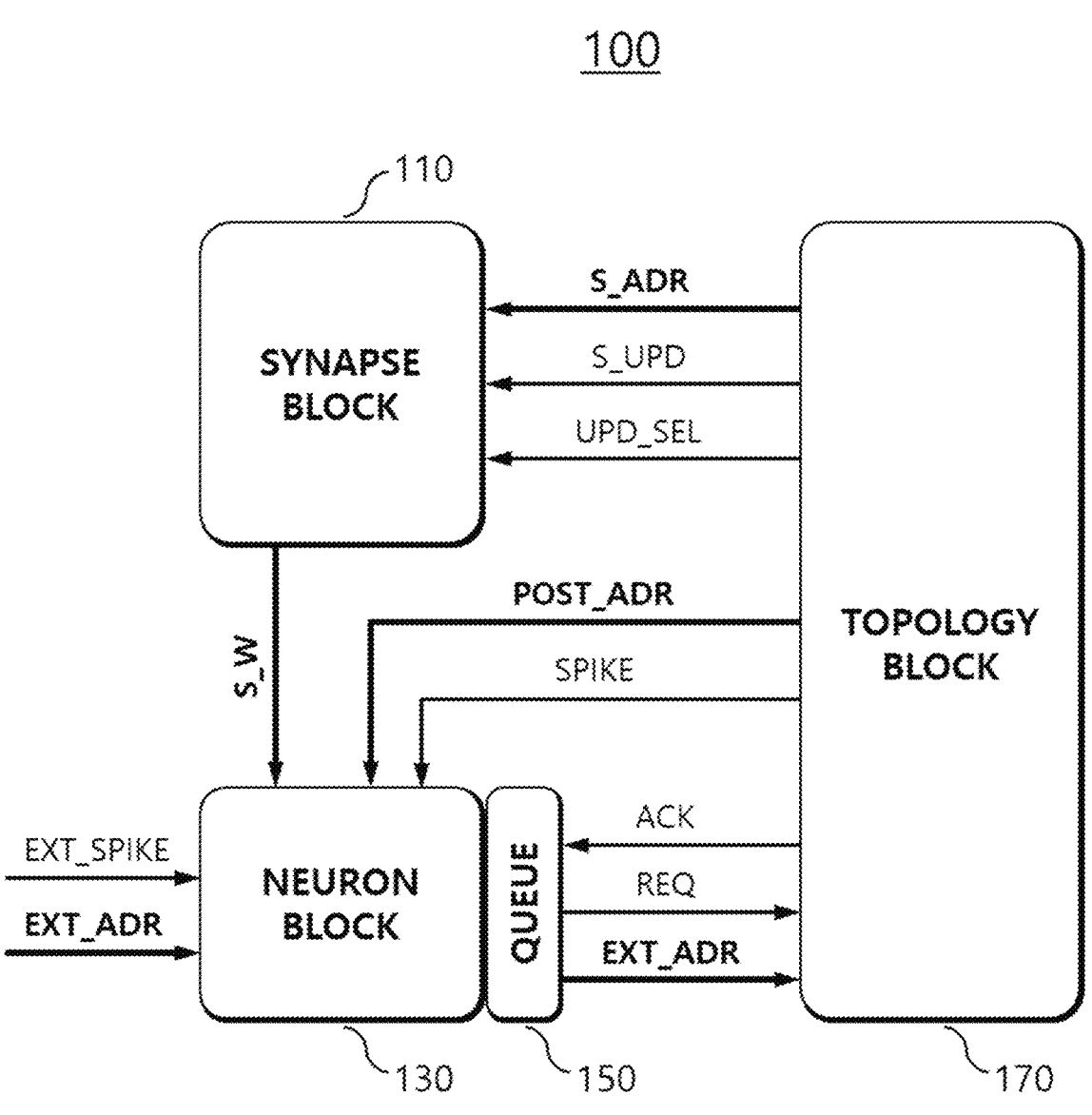
FIG. 1 is a diagram illustrating a neuromorphic device according to an embodiment of the present disclosure.

The description of the present disclosure is merely an exemplary embodiment for structural and functional descriptions. This present disclosure should not be construed as limited to the embodiments set forth herein. That is, since the embodiments may have various modifications and variations, it is understood that the scope of the present disclosure includes equivalences that implement the technical concept. In addition, a specific embodiment should include all the proposed objects or effects or include only the effects, and accordingly, it should not be understood that the scope of the present disclosure is limited thereby.

Meanwhile, the terms described in the present application should be understood as follows.

The terms "first" and "second" are used to distinguish one element from another element, and the scope of the present disclosure should not be limited by these terms. For example, a first element may also be referred to as a second element, and similarly, a second element may also be referred to as a first element.

It will be understood that when an element is referred to as being "connected" to another element, it may be directly connected to the other element, or it will be understood that an element may exist therebetween. However, when an element is referred to as being "directly connected" to another element, it will be understood that there is no element therebetween. Meanwhile, other expressions describing a relation between elements, that is, "between~", "directly between~", "neighboring~", "adjacent to~", and the like should be interpreted in the same way.

A singular expression should be interpreted to include a plural expression unless it does not mean otherwise in the context, and it is understood that term "include" or "have" indicates that a feature, a number, a step, an operation, a component, a part, or the combination thereof described in the specification is present but does not exclude a possibility of presence or addition of one or more other features, numbers, steps, operations, components, parts, or combinations thereof, in advance.

It will be understood that an identification code (e.g., a, b, c, etc.) is used for the convenience of description. The identification code is not intended to describe an order of steps, but the steps may occur in the same order as the specified order or may be performed substantially at the same time or may be performed in opposite order.

The present disclosure may be implemented as codes readable by a computer on a recording medium readable by a computer, and the recording medium readable by a computer includes all types of recording devices in which data readable by a computer system is stored. An example of the recording medium readable by a computer includes ROM, RAM, CD-ROM, magnetic tape, floppy disk, optical data storage device, and the like. In addition, in the recording medium readable by a computer, codes readable by a computer may be distributed on a computer system connected via a network and stored and executed in a distributed manner.

Unless it is contrarily defined, all terms have the same meanings as those generally understood by a person with ordinary skill in the art. Terms which are defined in a generally used dictionary should be interpreted to have the same meaning as the meaning in the context of the related art and are not interpreted as an ideal meaning or excessively formal meanings unless clearly defined in the present application.

A neuromorphic system can be built using neurons that are interconnected through synapses. The implementation of neurons and synapses is diverse. Analog and/or digital integrated circuits (IC) based on standard complementary metal oxide semiconductor (CMOS) technologies are common. Several novel approaches make use of emerging devices such as phase change memory, magnetic tunnel junctions, volatile threshold switches, and floating-gate transistors. The method of event routing among the neurons may be generally classified as i) dedicated routing and ii) lookup table (LUT)-based routing schemes.

In the dedicated routing scheme, neurons may be connected through a set of synapses that are directly assigned to them by hardwires or encoder-decoder pairs. The main advantage is that its semi- or fully parallel event routing protocol supports the real-time operation of SNN without posing a challenge of fast neuronal and synaptic ICs.

However, its limited reconfigurability may be a downside unless $N^2$ programmable synapses are deployed for N neurons. The use of a fully connected network may be limited depending on the network of concern, for instance, reward predicting networks with feedback connections may hold specific innate synaptic pathways, and learning may alter the weight values along such pathways. Thus, only a small portion of the $N^2$ synapses may be used in this case, posing an issue of synapse redundancy.

The LUT-based routing scheme may provide a solution to this issue by tabulating the entire neuronal connections in a LUT and sending the events following the LUT, instead of implementing the connections physically. That is, this enables any synapse in the synapse array to be used for any arbitrary pair of neurons as per conceived network architecture, leveraging reconfigurability.

As a result, the reconfigurability may be maintained with much fewer built-in synapses than $N^2$. This routing method may be applied to not only single neuromorphic cores but also largescale multicore neuromorphic systems such as SpiNNaker, TrueNorth, Neurogrid, HiAER, DYNAPs, and Loihi. Most of these examples are based on the address event representation (AER) protocol that tags each spike with the address of the emitting neuron and puts the spike into a queue for sequential transmission.

The AER protocol is readily applicable using standard memory technologies but needs high clock speed. Furthermore, such large-scale neuromorphic systems may be often eligible for only "inference" (on-chip learning is not included). On-chip local learning bases synaptic weight update on a local learning rule that depends only on local information. The major difficulty in real-time on-chip local learning arises from the inverse lookup that consumes significant time, thereby hindering real-time learning.

FIG. 1 is a diagram illustrating a neuromorphic device according to an embodiment of the present disclosure.

Referring to FIG. 1, a neuromorphic device 100 may include a synapse block 110, a neuron block 130, a queue register block 150, and a topology block 170.

The neuromorphic device 100 may correspond to an architecture for signal transfer in a neural network for integration of reconfigurable spiking neural network. In addition, the neuromorphic device 100 may correspond to a neuromorphic core, and may be implemented as one system to operate.

The signal transfer of the spike operating in the neuromorphic device 100 may operate as below. An address of neuron in which a spike is generated may be temporarily saved in the queue register block 150 and wait for an approval (ACK) of the topology block 170 using the handshaking protocol. Simultaneously with the approval (ACK) of the topology block 170, the address of neuron may be transferred to the topology block 170 and start to read a Lookup Table (hereinafter, LUT) that records connection information of all neurons to search the information of all neurons. The information of neurons in a connection relationship is sequentially identified, and the neurons may be transferred immediately. In this case, a connection weight value of the corresponding connection is added to the synapse block 110, and the information is transferred to the postsynaptic neuron, and simultaneously, a membrane potential of the postsynaptic neuron may be increased.

The neuromorphic device 100 may allow an implementation of on-chip learning as well as inference and have an advantage that a real time connection weight value update for which the on-chip learning is available by considering the connection relationship of synapse and pre and postsynaptic neuron spike timing.

The synaptic block 110 may include a synapse array configured with a plurality of synapses, and each of a plurality of synapses may have an intrinsic synapse address. In other words, a synapse array may be designated as an S_ADR pointer that indicates a specific synapse. In an embodiment, the synapse block 110 may operate as a synapse block unit.

The neuron block 130 may include a neuron array configured with a plurality of neurons, and each of a plurality of neurons may have an intrinsic address of neurons. In other words, the neuron array may be designated as a POST_ADR pointer that indicates a specific neuron. In addition, each of the neurons may be designated externally through an EXT_ADR pointer and may be stimulated by an EXT_SPIKE signal. In an embodiment, the neuron block 130 may operate as a neuron block unit.

The queue register block 150 may correspond to a standard First In First Out (FIFO) buffer that stores an address of neuron according to a spiking time order generated in the neuron for sequential transmission of spike. When a specific neuron generates a spike, the address N_ADR of the neuron may be transmitted and stored in the queue register block 150. The queue register block 150 may communicate with the topology block 170 through a handshake protocol. When receiving an event of a spike, the queue register block 150 may transmit a routing request queue (REQ) to the topology block 170 to remove an event from queue and may wait for an approval signal (ACK) from the topology block 170.

The topology block 170 may correspond to a memory array that stores event routing LUT(s). Since SRAM is used as a LUT memory, SRAM may be fast enough to read within a single clock cycle in a clock speed range (10~200 MHz). A commonly used LUT is two-column table, and a length of each column may be same as a total number of synapses in the network. When receiving REQ from the queue register block 150, the topology block 170 may transmit ACK in an idle state and by reading N_ADR and search fan-in and/or fan-out connections related to the corresponding neuron in the LUT. In an embodiment, the topology block 170 may operate as a topology block unit. In addition, the topology block 170 may include a plurality of parallel LUT modules. The parallel LUT module will be described in FIG. 6 in detail.

Figure 2:
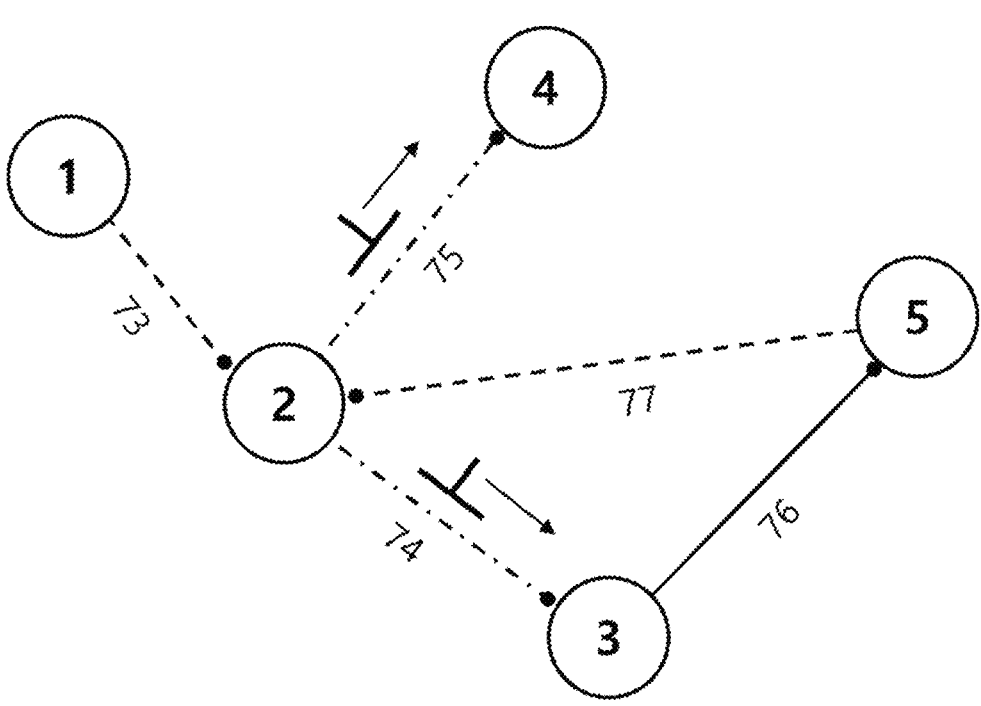
FIG. 2 is a diagram illustrating an embodiment of a network configured with neurons and synapses.
Figure 3:
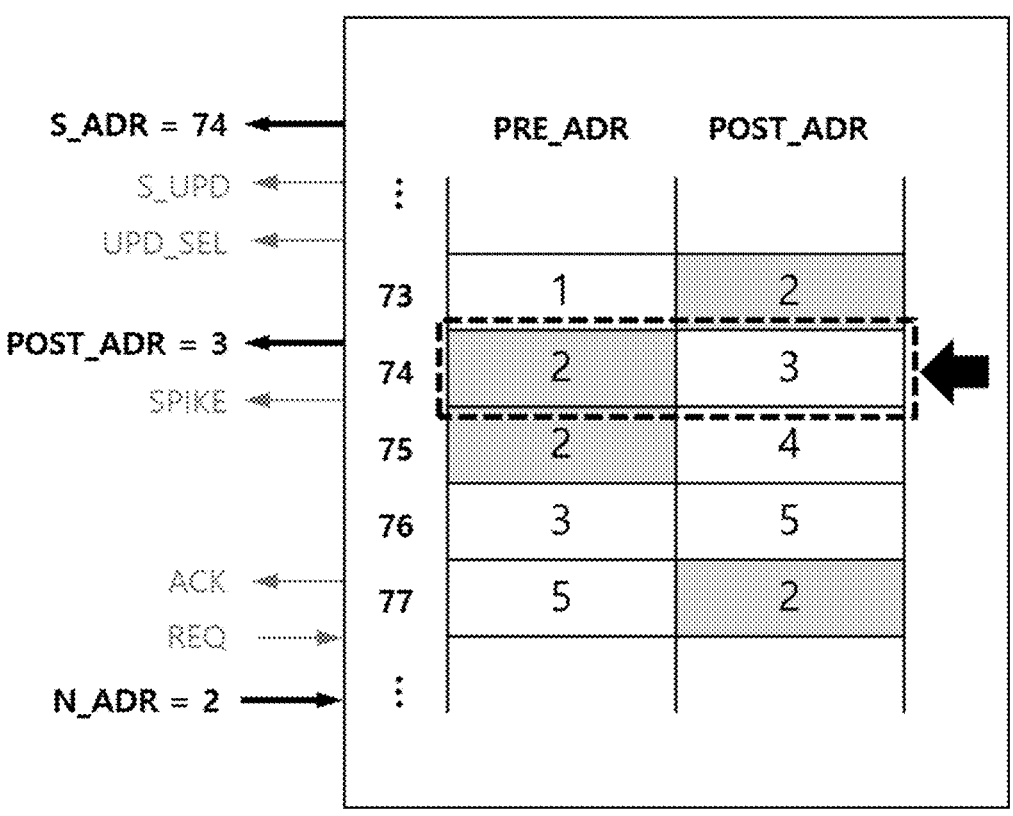
FIG. 3 is a diagram illustrating a LUT used in the topology block unit of FIG. 1.

FIG. 2 is a diagram illustrating an embodiment of a network configured with neurons and synapses. FIG. 3 is a diagram illustrating a LUT used in the topology block unit of FIG. 1.

Referring to FIG. 2, the LUT may be arranged along a synapse index (or address). In the case of the network shown in FIG. 2, each synapse 73 may have 1 and 2 of PRE_ADR and POST_ADR. Accordingly, in FIG. 3, the $73^{rd}$ row may exist with 1 and 2 in the left and right columns, respectively. When the given neuron is a postsynaptic neuron, the synapse may correspond to the fan-in synapse of the neuron. For example, in FIG. 2, in the case of neuron 2, synapses 74 and 75 may correspond to it. The given neuron may correspond to the fan-out synapse which is a presynaptic neuron. For example, in the case of neuron 2, synapses 73 and 77 may correspond to it.

FIG. 4 is a diagram illustrating signals used in a neuromorphic device according to an embodiment of the present disclosure.

Referring to FIG. 4, the denotation of signals used in the neuromorphic device 100 may be identified. Representatively, N_ADR may correspond to an event address and POST_ADR may correspond to an address of a postsynaptic neuron, and S_ADR may correspond to a synapse address. In addition, S_W may correspond to a synapse weight value. UPD_SEL may correspond to a signal which indicates whether the synapse designated by S_ADR is fan-in synapse or fan-out synapse.

Figure 5:
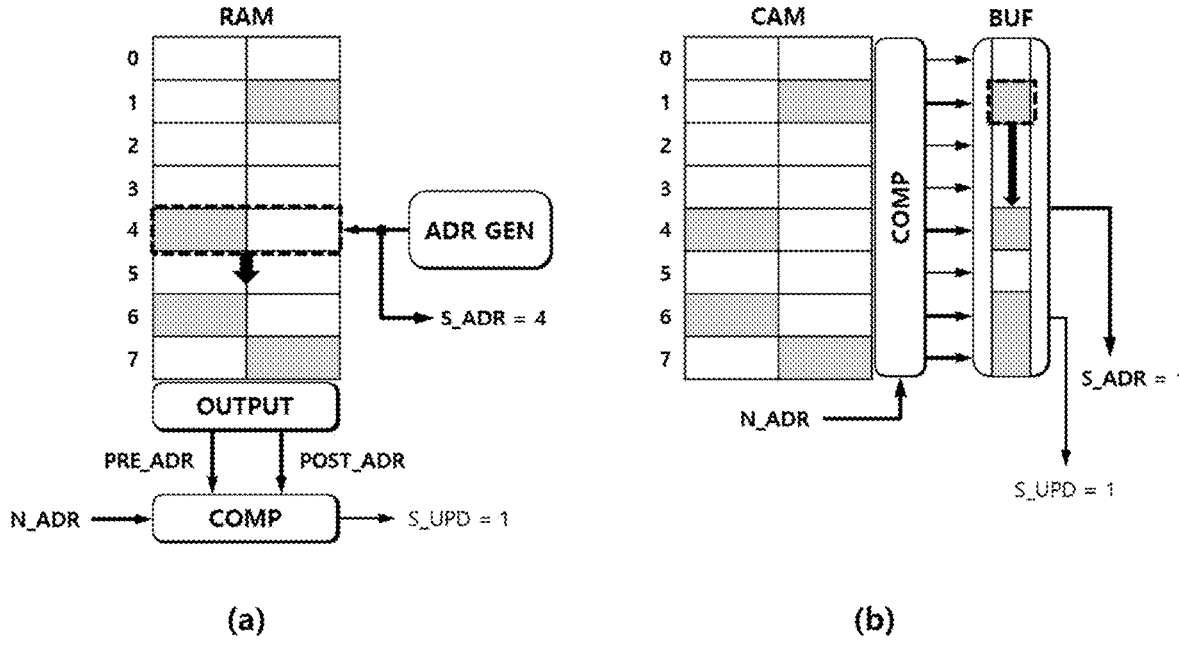
FIG. 5 is a diagram illustrating RAM scheme and CAM scheme.

FIG. 5 is a diagram illustrating RAM scheme and CAM scheme. FIGS. 7A-7I are diagrams illustrating an experiment result for a maximum network size for different routing schemes.

A LUT search may correspond to an operation that consumes time. In other words, the more synapses in a network, the larger LUT is needed, which likely consumes more time. Thus, events are more likely piled up in the queue register block 150, causing delays in routing. To prevent this, the total event-routing time ($T_{srch}+T_{send}+T_{upd}$) needs to be shorter than the average Inter Spike Interval (ISI) of all spikes from all neurons that share the same pipeline in the queue register block 150. Assuming Poisson neurons whose spike firing follows a Poisson (renewal) process, this condition may be expressed as following Equation 1.

$$T_{srch} + T_{send} + T_{upd} \leq \frac{1}{aN} \qquad \text{[Equation 1]}$$

Here, 1/aN is an average ISI for Poisson spikes, where a and N are the spiking activity of each neuron and the total number of neurons, respectively. Therefore, to increase the SNN size (N) without traffic congestion, it is necessary to decrease $T_{srch}$, $T_{send}$ and/or $T_{upd}$.

Referring to FIG. 5, the RAM and CAM schemes may be identified as an event routing scheme applicable to the topology block shown in FIG. 1. The RAM and CAM schemes are two extreme cases that may respectively support a fully sequential and parallel search of the LUT.

In the drawing of FIG. 5(a), the RAM scheme employs a single RAM array for a LUT structured identically to that in FIG. 3. The LUT may correspond to an S*2 matrix (S is the number of synapses). The number of synapses may be equal to the sum of the number of fan-in neurons ($F_{in}$) for all N neurons in the network which may also be equal to the sum of the number of fan-out neurons ($F_{out}$) for all neurons. This may be represented in following Equation 2.

$$S = \sum_{i=1}^{N} F_{in}^i = \sum_{i=1}^{N} F_{out}^i \qquad \text{[Equation 2]}$$

Here, the superscript i of $F_{in}^i$ and $F_{out}^i$ denotes a neuron index. The LUT may be accessed by an address pointer S_ADR in search of the rows including a particular N_ADR. The address pointer may be generated by the address generator ADR GEN. The LUT may be row-wise read in a sequential manner, outputting PRE_ADR and POST_ADR of each row.

In addition, the comparator COMP may detect a match between N_ADR and PRE_ADR (POST_ADR), and when the match is detected, the comparator may output S_UPD (=1), a trigger for update. Each row may be simultaneously read and compared within a single clock cycle, so that the LUT search time may correspond to S/$f_{clk}$, that is, $T_{srch}$=S/$f_{clk}$.

In addition, both spike sending and update processes may be performed simultaneously with the LUT search, and thus, $T_{send}$ and $T_{upd}$ may correspond to zero. In this case, Equation 1 results in S≤$f_{clk}$/(aN) allowing the maximum number of synapses to ($S_{max}$), and this may be represented in following Equation 3.

$$S_{max} = \frac{f_{clk}}{aN} \qquad \text{[Equation 3]}$$

Figure 7A:
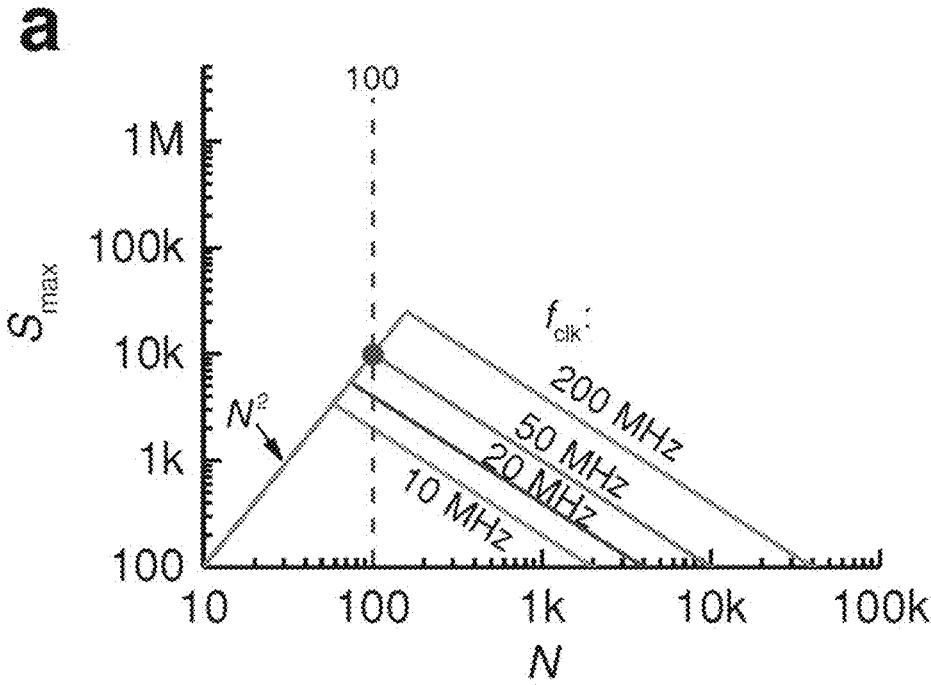
FIGS. 7A-7I are diagrams illustrating an experiment result for a maximum network size for different routing schemes.
Figure 7B:
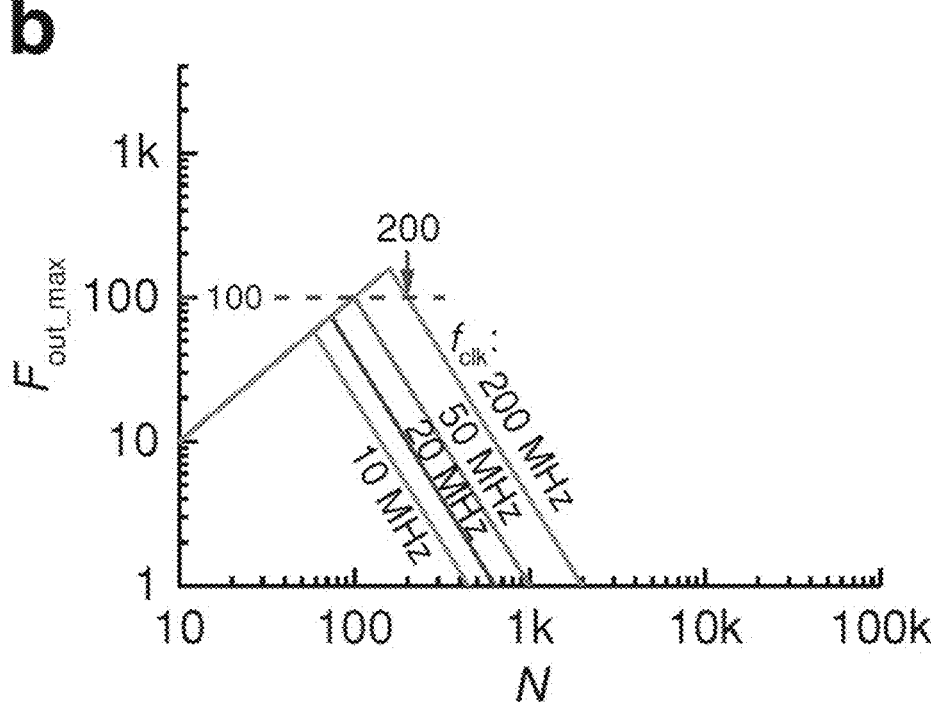
Figure 7C:
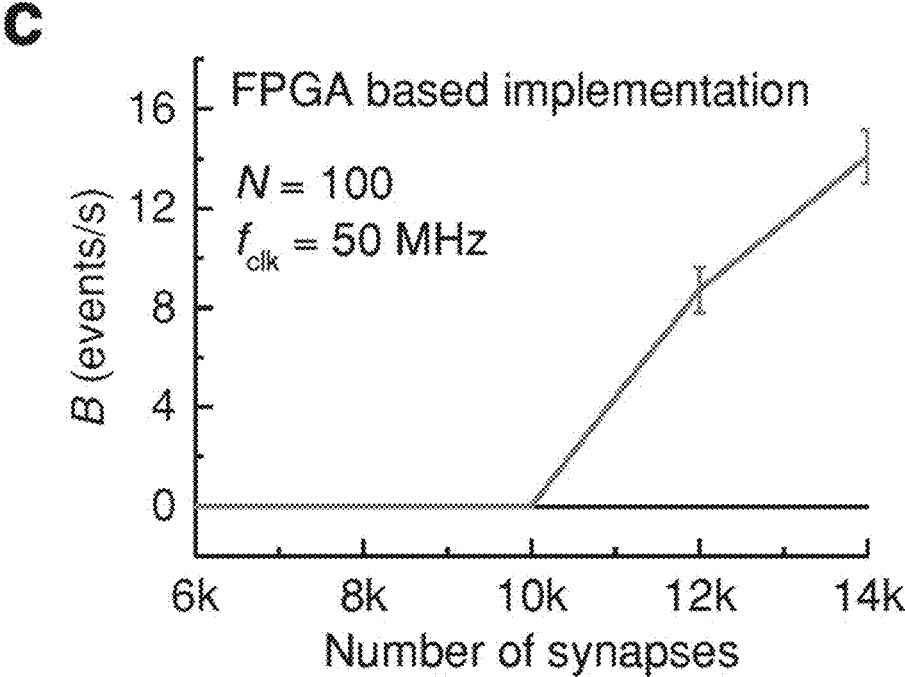

This relationship for different clock speeds may be identified in FIG. 7A for a=50 Hz. Assuming the uniform neuronal interconnection, Equation 2 reads S=NF$_{in}$=NF$_{out}$. In this case, the maximally allowed $F_{out}$ ($F_{out\_max}$) may be derived from Equation 3 as $F_{out\_max}$=$f_{clk}$(aN²) (see FIG. 7B). That is, the RAM scheme may support an $F_{out\_max}$ of 100 for each of total 200 neurons at 200 MHz clock speed. This theoretical estimation may be verified by real-time monitoring event routing in a network (N=100) realized on an FPGA at 50 MHz clock speed.

In addition, S is varied from 6,000 to 14,000 (along the red dashed line in FIG. 7A) and routing traffic congestion on average can be evaluated—parameterized by the average number of events (B) piled up in the queue register block 150 per neuron per second. B may correspond to zero without traffic congestion. Every neuron may be externally simulated to produce Poisson spikes at a=50 Hz. The results shown in FIG. 7C support the theoretical estimation in that event build-up (traffic congestion) is apparent when S exceeds 10,000 that equals to Smax from Equation 3.

A LUT (S×2 matrix) may be stored in a CAM array as illustrated in FIG. 5(b). Meanwhile, each memory row may have an independent comparator. During spike routing, all rows in the LUT may be looked into at one time in search of the rows including N_ADR, and the search result for all rows—"0" (no match) or "1" (match)—may be temporarily stored in a buffer (BUF).

The buffer may correspond to an S-element memory array—one entry for each row of the LUT—and connected to a priority encoder that outputs the address of a matched synapse (S_ADR). Each entry of "1" in the buffer may be translated to its address (S_ADR) by the priority encoder, which may be simultaneously sent out in conjunction with S_UPD (=1). In the next clock cycle, this entry in the buffer is erased, and the next entry of "1" (if exists) may be sent at one time. This process may be repeated until the buffer becomes empty.

Search time $T_{srch}$ in the CAM scheme may be equal to the CAM matching latency plus the time required for the matching data transfer to the buffer. Assuming that the CAM is sufficiently fast in the clock speed range, both operations may be conducted within a single clock cycle, thus, resulting in $T_{srch}$=1/$f_{clk}$.

In addition, spike sending time $T_{send}$ may correspond to the time required to address all matches in the buffer. For uniform neuronal interconnection, there are 2$F_{out}$ ($F_{out}$=$F_{in}$) matches per event, thereby $T_{send}$=2$F_{out}$/$f_{clk}$, where $F_{out}$=S/N.

Additionally, neuron and synapse updates may be simultaneous with spike sending, and thus, effectively $T_{upd}$=0. Accordingly, Equation 1 for this scheme may become S≤$f_{clk}$/(2a)–N/2, allowing $S_{max}$ and $F_{out\_max}$ as represented in following Equation 4.

$$\begin{cases} S_{max} = \dfrac{f_{clk}}{2a} - \dfrac{1}{2}N \\ F_{out\_max} = \dfrac{f_{clk}}{2aN} - \dfrac{1}{2} \end{cases} \qquad \text{[Equation 4]}$$

Figure 7D:
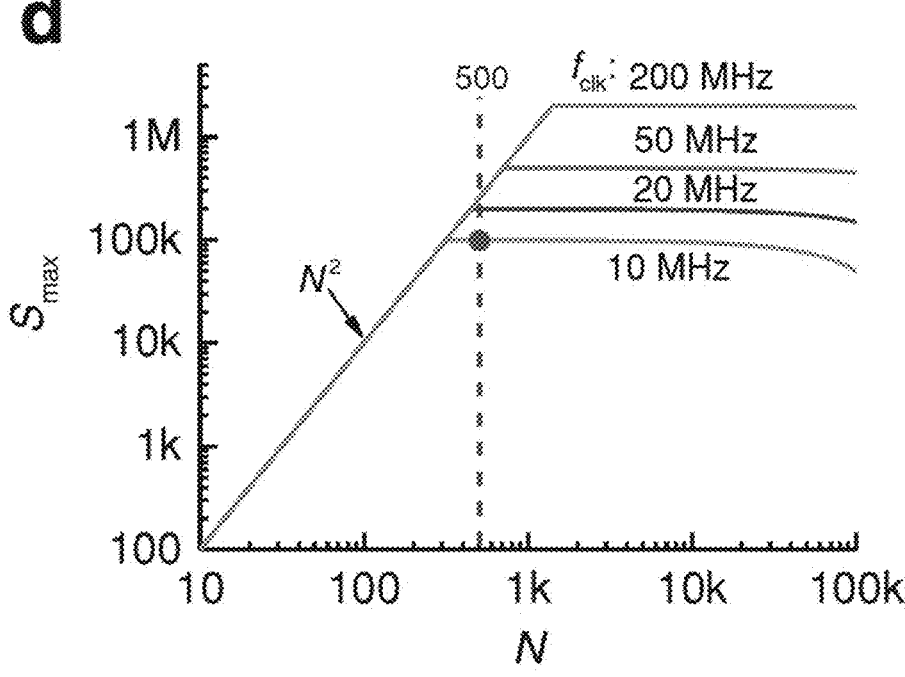
Figure 7E:
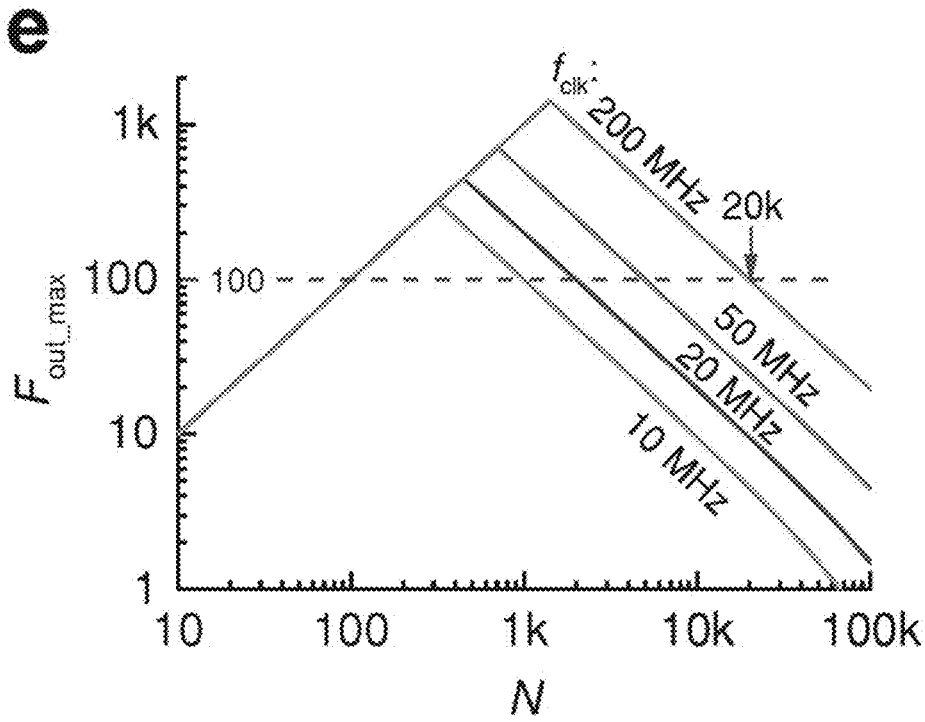

FIG. 7D displays $S_{max}$ with respect to N for different clock speeds. In this case, a may be set to 50 Hz. The estimated $S_{max}$ value may surpass those for the RAM scheme by several orders of magnitude (cf. FIG. 7B), enabling to host much more neurons and synapses. FIG. 7E shows the capability of a much larger $F_{out\_max}$.

For instance, each of 20,000 neurons may have an $F_{out}$ of 100 at 200 MHz $f_{clk}$ without routing traffic congestion. The theoretical estimation may be confirmed by simulating event routing for a model network including 500 neurons (a=50 Hz) at 10 MHz clock speed.

Figure 7F:
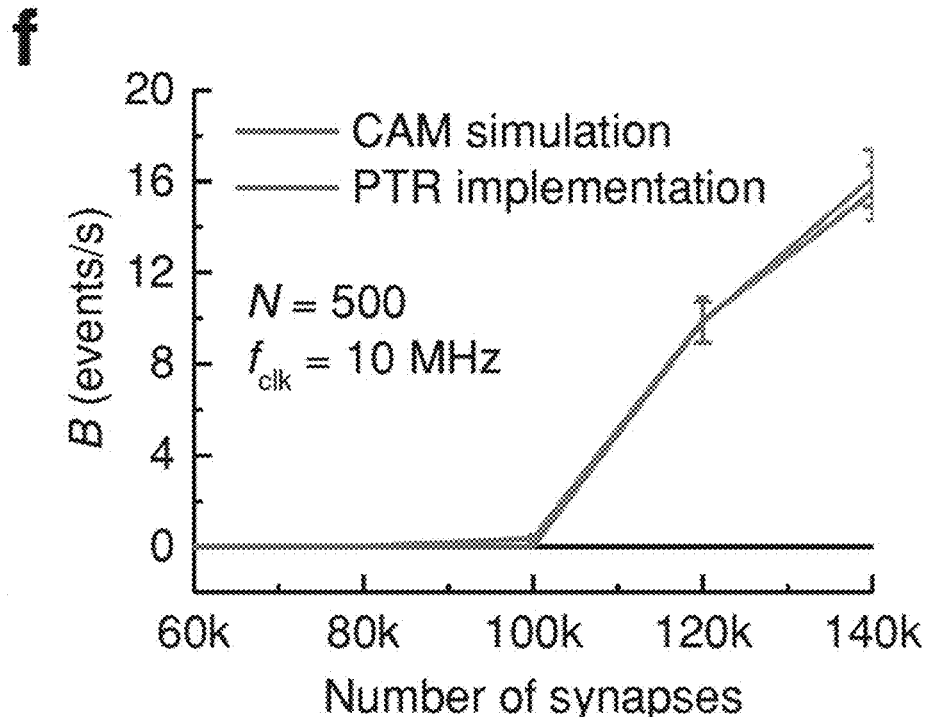

In this case, B may be monitored with varying S values from 60,000 to 140,000 (along the red dashed line in FIG. 7D). The results in FIG. 7F shows no delay in event routing for S below $S_{max}$ (about 100,000). In the fact that the theoretical estimation may be verified only by simulation because the CAM implementation on the FPGA board is limited to small SNNs.

Figure 6:
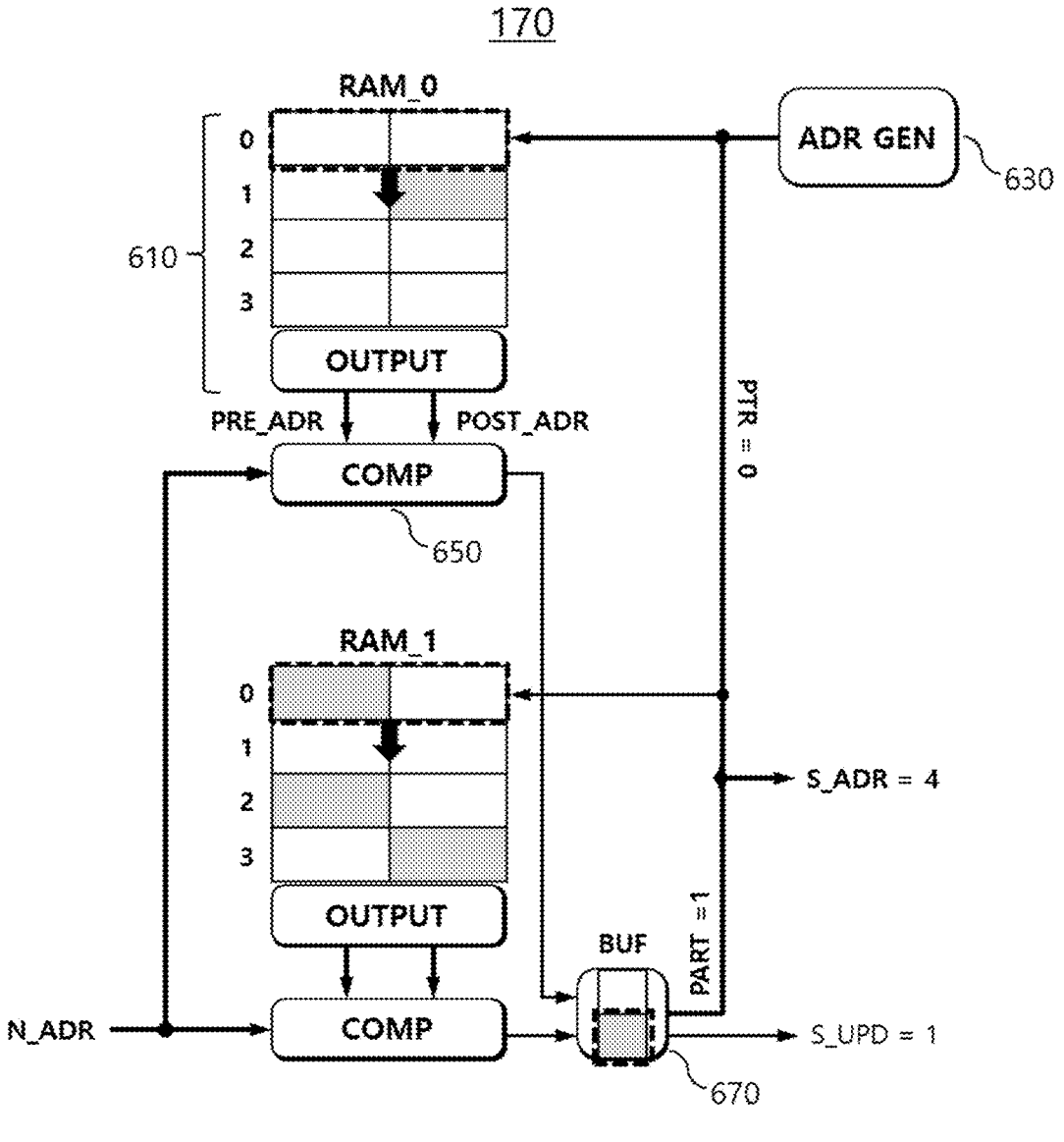
FIG. 6 is a diagram illustrating the operation of the topology block in FIG. 1.

FIG. 6 is a diagram illustrating the operation of the topology block in FIG. 1.

Referring to FIG. 6, the topology block 170 may include a parallel LUT module 610, an index address generator 630, a comparator 650, and a buffer 670.

The neuromorphic device 100 according to an embodiment of the present disclosure may include a neuron block unit, a synapse block unit, and a topology block unit. In this case, the neuron block unit may correspond to the neuron block 130, the synapse block unit may correspond to the synapse block 110, and the topology block unit may correspond to the topology block 170.

The neuromorphic device 100 may divide a full LUT (S×2 matrix) into M sub-LUTs such that each sub-LUT has P×2 entries (P=S/M) as shown in FIG. 3. Each partition may include the parallel LUT module 610 and the comparator 650 corresponding to an RAM array. All partitions may share the same address PTR to address a particular row for all M sub-LUTs at one time.

For instance, in FIG. 3, the PTR (=2) generated by ADR GEN may simultaneously address all second rows of the M sub-LUTs. Next, the output PRE_ADR and POST_ADR from each sub-LUT may be compared with N_ADR to find a matching entry. In this case, all M comparisons for all partitions may be performed in parallel. The PTR scrolls through the P rows, and a match result—"0" (no match) and "1" (match)—for each row may be transferred to the buffer 670.

The parallel LUT module 610 may be partitioned based on a first synapse address among synapse addresses, and each of the partitions may be indexed based on a second synapse address among the synapse addresses and include pre and post neuron elements configured with addresses of a presynaptic neuron and a postsynaptic neuron. The first synapse address among synapse addresses may designate one of a plurality of parallel LUT modules 610, and the second synapse address may designate one of a plurality of pre and post neuron elements in the parallel LUT module 610.

The parallel LUT module 610 may be generated by dividing a memory array into plural partitions, storing each partitioned LUT, and disposed to perform a LUT search in parallel. That is, the parallel LUT module 610 may correspond to a partitioned RAM. The parallel LUT module 610 may store pre and post neuron elements, and the pre and post neuron elements may include addresses of a presynaptic neuron and a postsynaptic neuron.

The pre and post neuron elements are a unit of storing in the parallel LUT module 610, and each parallel LUT module 610 may store the same number of pre and post neuron elements. For example, when the number of total synapses is S and the number of parallel LUT modules 610 is M, each parallel LUT module 610 may store S/M (=P) pre and post neuron elements.

In one embodiment, the topology block unit may determine a higher bit string capable of expressing a plurality of parallel LUT modules 610 to the first synapse address in the synapse address. In another embodiment, the topology block unit may determine a lower bit string capable of indexing a plurality of the synapses by each of a plurality of parallel LUT modules 610 to the second address.

That is, the topology block unit may partition a synapse address into two and determine one to the first synapse address and determine another to the second synapse address. Particularly, a partition point may be determined depending on the number of parallel LUT modules 610. For example, in the case that the number of parallel LUT modules 610 is 8, since a bit number capable of expressing 8 or more is 3, the topology block unit may determine higher than 3 bit strings to the first synapse address and determine the remaining lower bit strings to the second synapse address. In this case, the number of remaining lower bit strings may satisfy the condition capable of indexing each of all synapses stored in a single parallel LUT module 610.

In one embodiment, the topology block unit may further include the index address generator 630 for generating index addresses to be provided to each of the parallel LUT modules 610 sequentially up to the second synapse address. The index address PTR generated by the index address generator 630 may increase up to a maximum value of the second synapse address, and thus, the topology block unit may search a plurality of parallel LUT modules 610 sequentially from first to last. In FIG. 6, the index address generator 630 may be connected to each of the parallel LUT modules 610 and provide generated index addresses sequentially.

In one embodiment, upon receiving an index address, the topology block unit may further include the comparator 650 for comparing one of the addresses of a presynaptic neuron and a postsynaptic neuron in the pre and post neuron elements respectively output from each of the parallel LUT modules 610 with an address of a spiking neuron. The comparator 650 may operate by being coupled with each of the parallel LUT modules 610 and detect a match by comparing PRE_ADR and POST_ADR in the pre and post neuron elements designated by the index address provided by the index address generator 630 with N_ADR.

In one embodiment, when the address of a spiking neuron coincides with the addresses of a presynaptic neuron and a postsynaptic neuron, the comparator 650 may output the corresponding index address. Here, the address of a spiking neuron may correspond to N_ADR, and when PRE_ADR or POST_ADR identical to N_ADR is detected, the corresponding index address may be output. All comparators 650 may be connected to one buffer 670, and the result output from the comparator 650 may be sequentially stored in the buffer 670.

In one embodiment, the topology block unit may further include the buffer that includes a plurality of index storage spaces partitioned based on the first synapse address. The buffer 670 may store the result output from the comparator 650 and form storage spaces as much as the number of the parallel LUT modules 610. That is, a plurality of index storage spaces may correspond to each of the parallel LUT modules 610.

In one embodiment, the buffer 670 may provide a synapse update signal S_UPD through spiking whether the address coincides with one of the presynaptic neuron or the postsynaptic neuron. The buffer 670 may transmit a match result to the priority encoder, and the priority encoder may perform an operation of outputting the matching partition, that is, an address of the parallel LUT module 610. When a match is detected, the operation of the index address generator 630 is paused, and the corresponding S_ADR and the synapse update signal (S_UPD=1) may be transmitted, and simultaneously, the entry in the buffer 670 may be deleted.

In one embodiment, when a specific index address is output from the comparator 650, the topology block unit may store the specific index address in the corresponding index address storage space. That is, the output result from the comparator 650 may be stored in the buffer 670 and stored in the index address storage space corresponding to the corresponding parallel LUT module 610 in the buffer 670.

In one embodiment, when a coincidence occurs through the comparison, the topology block unit may merge the address of the corresponding parallel LUT module 610 with the index address provided by the corresponding parallel LUT module 610 to output as an address of the synapse connected to the spiking neuron. For example, in FIG. 6, when the parallel LUT module is configured with RAM_0 and RAM_1, and a match is detected in index 0 of RAM_1, since there are two parallel LUT modules, the parallel LUT module may be distinguished with a bit string of size 1, and since each parallel LUT module is configured with 4 pre and post neuron elements, the parallel LUT module may be distinguished with a bit string of size 2.

Therefore, since PART="1" corresponds to bit string "1" and PTR="0" corresponds to bit string "00", the topology block unit may interconnect bit string "1" with bit string "00" and output 4 that corresponds to bit string "100" as an address S_ADR of the synapse.

In one embodiment, when a plurality matching is detected at once, the topology block unit may repeat the spike transfer process as much as the matching number. Further, the topology block unit may restart the LUT search.

The total search time per event performed by the topology block unit may be denoted as $T_{srch}=P/f_{clk}$. The total event transmission time may be identical to the case of the CAM scheme and correspond to $T_{send}=2F_{out}/f_{clk}$, which is $F_{out}=S/N$ for a uniform neuron interconnection. In addition, the neuron and synapse update may occur simultaneously with the event transmission. Accordingly, $S_{max}$ and $F_{out\_max}$ may be represented by Equation 5 below for the present disclosure.

$$\begin{cases} S_{max} = \dfrac{f_{clk}}{2a} - \dfrac{P}{2}N & \text{[Equation 5]} \\[2mm] F_{out\_max} = \dfrac{f_{clk}}{2aN} - \dfrac{P}{2} \end{cases}$$

Figure 7G:
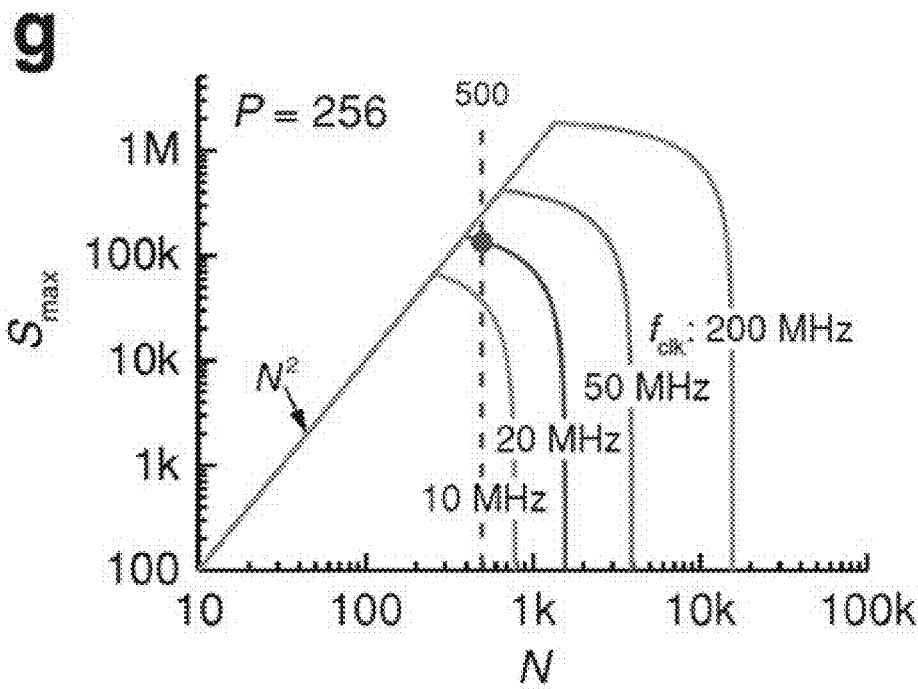
Figure 7H:
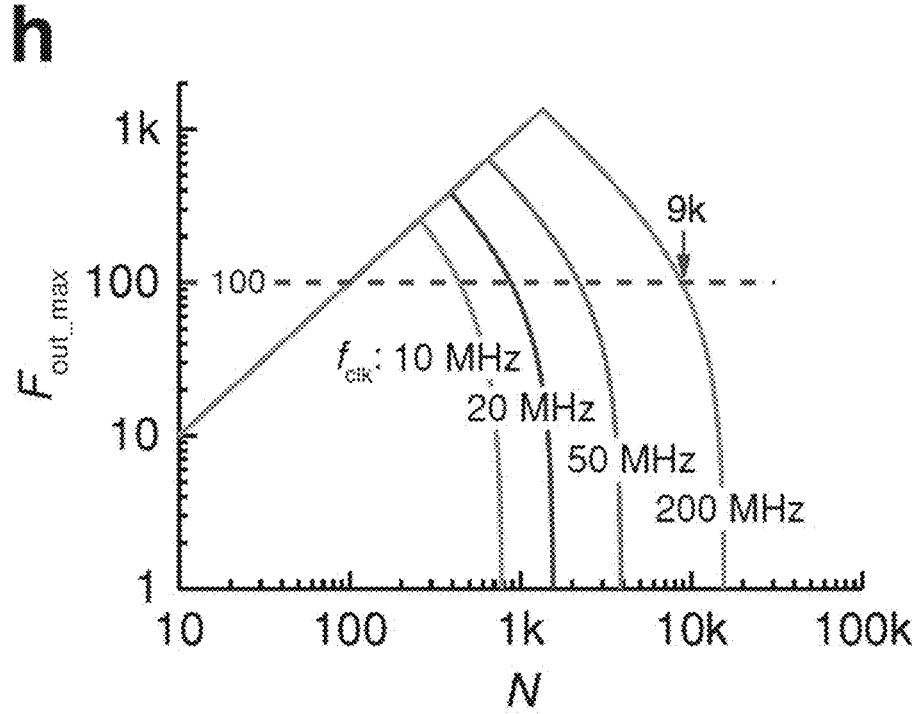
Figure 7I:
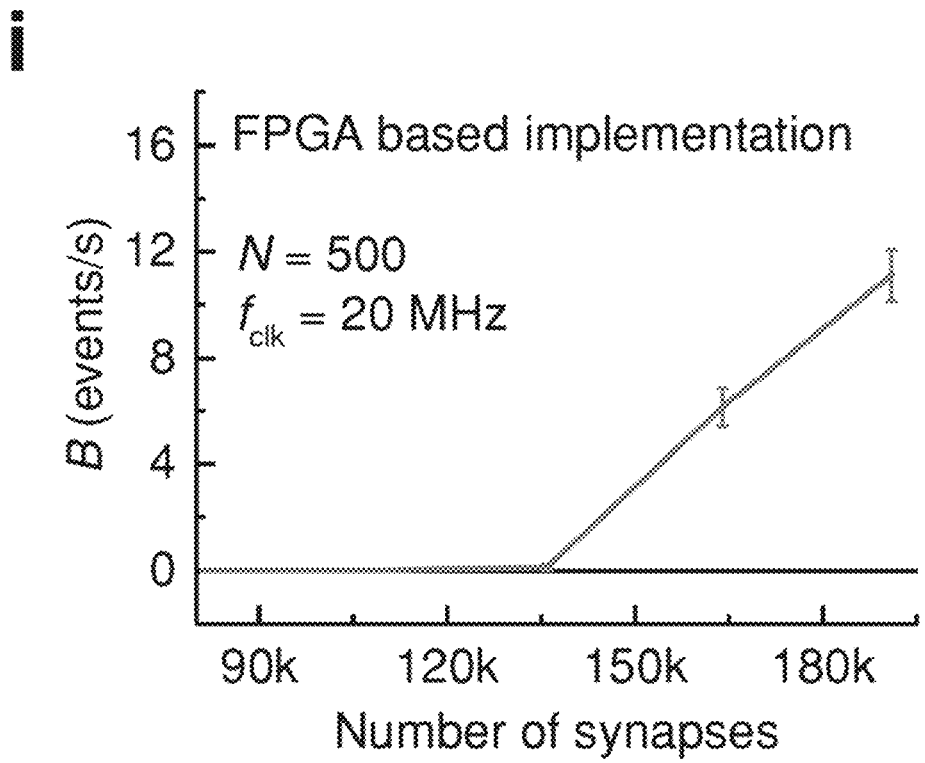

FIG. 7G shows a relationship between a=50 Hz and P=256. $F_{out\_max}$ per neuron is identified in FIG. 7H. As denoted by red dashed line in FIG. 7H, 100 $F_{out\_max}$ may be supported in 200 MHz clock speed for each of about 9,000 neurons in the present disclosure. Accordingly, the capacity may correspond between those of RAM and CAM schemes (refer to comparison of FIG. 7H and FIGS. 7B and 7E).

When P=1, the present disclosure becomes identical to the CAM scheme, and Equation 5 becomes identical to Equation 4. In order to verify this theoretical estimation, the network (N=500, a=50 Hz and P=256) to which the present disclosure (implemented in a FPGA board with 20 MHz clock speed) is applied is monitored in real time, and the event buildup for S (80,000~210,000) may be analyzed. On the point that as the result of FIG. 7I, the routing traffic congestion starts in 136,000 synapses which is identical to $S_{max}$ value, theoretically, Equation 5 may be verified.

So far, the present disclosure is described with reference to a preferred embodiment, but it will be apparent to those skilled in the art that various modifications and variations may be made in the present disclosure without departing from the spirit or scope of the disclosure.

[Description of Reference Characters]

| | |
|---|---|
| 100: neuromorphic device | |
| 110: synapse block | 130: neuron block |
| 150: queue register block | 170: topology block |
| 610: parallel LUT module | 630: index address generator |
| 650: comparator | 670: buffer |

What is claimed is:

1. A neuromorphic device comprising:
a neuron block including a plurality of neurons, wherein each of the plurality of neurons has an intrinsic address;
a synapse block including a plurality of synapses, wherein each of the plurality of synapses has an intrinsic address; and
a topology block including a plurality of parallel Look-Up Table (LUT) modules including pre and post neuron elements configured with an address of a presynaptic neuron and an address of a postsynaptic neuron, wherein each parallel LUT module of the plurality of parallel LUT modules is partitioned based on a first synapse address among synapse addresses, and each of the partitions is indexed based on a second synapse address among the synapse addresses,
wherein the topology block further includes
an index address generator configured to generate index addresses and simultaneously provide a same index address of the index addresses to each parallel LUT module of the plurality of parallel LUT modules; and
a comparator configured to
simultaneously compare the address of the presynaptic neuron and the address of the postsynaptic neuron in the pre and post neuron elements respectively output from each parallel LUT module of the plurality of parallel LUT modules corresponding with the same index address with an address of a spiking neuron of the plurality of neurons included in the neuron block, and
output the same index address in response to the address of the spiking neuron coinciding with at least one of the address of the presynaptic neuron or the address of the postsynaptic neuron.

2. The neuromorphic device of claim 1, wherein the topology block determines a higher bit string capable of expressing the plurality of parallel LUT modules to the first synapse address in the synapse addresses.

3. The neuromorphic device of claim 2, wherein the topology block determines a lower bit string capable of indexing the plurality of the synapses by each parallel LUT module of the plurality of parallel LUT modules to the second synapse address.

4. The neuromorphic device of claim 1, wherein the index address generator is further configured to generate the index addresses sequentially up to the second synapse address.

5. The neuromorphic device of claim 1, wherein the topology block further includes a buffer that includes a plurality of index storage spaces partitioned based on the first synapse address.

6. The neuromorphic device of claim 5, wherein the buffer provides a synapse update signal through spiking whether the address of the spiking neuron coincides with one of the address of the presynaptic neuron and the address of the postsynaptic neuron.

7. The neuromorphic device of claim 5, wherein, when a specific index address is output from the comparator, the topology block stores the specific index address in a corresponding index address storage space.

8. The neuromorphic device of claim 5, wherein, when a coincidence occurs through the comparison, the topology block merges an index address provided by a corresponding parallel LUT module to output as an address of a synapse connected to the spiking neuron.

* * * * *